Dec. 8, 1936.

B. W. FREEMAN

Re. 20,202

CUT-OUT MACHINE FOR SHOE UPPERS

Original Filed Dec. 3, 1923 3 Sheets-Sheet 1

INVENTOR.
BENJAMIN W. FREEMAN.
BY Riordon and Riordon
ATTORNEYS.

Dec. 8, 1936.

B W. FREEMAN

Re. 20,202

CUT-OUT MACHINE FOR SHOE UPPERS

Original Filed Dec. 3, 1923 3 Sheets-Sheet 2

INVENTOR.
BENJAMIN W. FREEMAN.

BY Rodewald Rieder

ATTORNEYS.

Dec. 8, 1936. B. W. FREEMAN Re. 20,202

CUT-OUT MACHINE FOR SHOE UPPERS

Original Filed Dec. 3, 1923 3 Sheets-Sheet 3

INVENTOR.
BENJAMIN W. FREEMAN.

BY Riordon and Riordon
ATTORNEYS.

Reissued Dec. 8, 1936

Re. 20,202

UNITED STATES PATENT OFFICE 20,202

CUT-OUT MACHINE FOR SHOE UPPERS

Benjamin W. Freeman, Cincinnati, Ohio

Division A
Division of original No. 1,681,033, dated August 14, 1928, Serial No. 678,213, December 3, 1923. Application for reissue, October 30, 1936, Serial No. 108,479

9 Claims. (Cl. 164—93)

My present invention is a machine for use in the manufacture of boots and shoes, and particularly for forming the openwork or cut-out sections in shoe uppers, as well as being utilized for all stamping work, perforating, ornamentation or the like, in connection with press machines.

This is a divisional reissue of my Letters Patent 1,681,033 dated August 14, 1928.

The device of this specification is particularly useful in the machine of my said Letters Patent which is directed to perform the cutting out operations for openwork shoes, following any design desired, as a machine action, and furthermore as a machine operation either before or after the shoe upper portions,—vamp, foxing, quarters, tip, etc.,—are united and united into the complete shoe upper, and preferably also with the thus completed shoe upper united at the heel, thus forming the "closed" article, open only at top and bottom. There are numerous advantages and economies in being able to stitch the upper, vamp, quarters, foxings, etc., together, as is now customary, and to unite the same at the heel, in order to have the shoe upper otherwise all ready for assembling on a last—as explained in my Letters Patent 1,675,295; but no machine prior to my own, so far as I am aware, has been capable of operating on such a closed upper to cut out the portions necessary to form the openwork part of the same. My machine performs this cutting out operation and an important feature of the same is that it will operate with equal facility upon the sides of the upper, particularly a closed upper, upon the quarter sections, through the vamp, foxing, tongue portion, or tip. I am enabled to perform these operations by having provided means which will enable any portion or portions of the work, upper or other material to be presented, while held flat and preferably while held under tension, and to provide ample spaces or clearance for those portions of the material not being acted on by the cutting devices.

My invention herein lies in the provision of a machine and operating instrumentalities which will enable the openwork designs or formations to be cut out entirely through the upper or upper and lining and without previously marking or forming any pattern on the work. This desirable result I accomplish by the provision of work cutting and work holding means which will enable the cutting devices to be alined or positioned with regard to a fixed edge or portion of the shoe upper itself; thus insuring the cutting out action with exact uniformity upon successive uppers of similar design. This feature is most important in practice, as the cutting out action leaves a plurality of narrow strips or straps and the spacing or width of these straps is most important. By means of my invention, wherein the straps are formed with exact relation to the edge or predetermined portion of the shoe upper, such as the top seam, side stitching or other fixed portion in the design, the resulting openwork is formed accurately with all straps, widths and strips of proper width, and with opposite quarter sections, for example, in perfect cooperation. This is an important advantage resulting from cutting out the openwork portions after the shoe upper sections have been stitched and united, as distinguished from first cutting out the upper sections and then stitching and uniting same.

To this end I utilize a clamping means either alone or as a combined clamp or holder for the work, and preferably as a guiding, or gauging or alining device, to insure that the cutting means and work will register. This enables me to eliminate entirely any marking or previously stencilling a design on the upper, before it is cut, as I can rely entirely upon the combined gauging and holding or clamping member to adjust the work relatively therewith, and the resulting cutting out operation insures perfect registering and alining of the design cut out, as, for example, with the fixed edges of a shoe upper. This feature in practice gives the important advantage of enabling the operator to speed up work on this machine, to quickly and accurately aline the work with regard to the clamp, because the latter is outside and on top of the work, while the cutting devices are underneath and out of sight. The operator need only position the work with regard to the topmost portion of the cutting anvil, viz, the clamp, and then at once position the same under a moving part such as a plunger and the tripping of a treadle will complete the cutting out action.

The clamping device as above noted constitutes also a protecting guard for that portion of the work adjacent the cutting out devices, during the cutting operation, and furthermore I form this clamp as a complete guard partly or entirely around the cut-out portion. Thus I hold the part of the work to be cut out, not merely at one or two points, but partly or entirely around the openwork portion to be formed, the clamp being cut out proportionately or in cooperation with the design of the openwork and protecting, as well as holding the material being operated upon. This clamp is preferably made of thin sheet metal, and preferably also is hinged or otherwise removably attached to the cutting anvil as above explained, and is so constructed and arranged as to place the work under proper tension to prevent displacement of same during the cutting out operation. My improved clamp, which I have designated as a "mask", is of great importance in the operation of cutting out, perforating, or ornamenting parts or portions of material. Heretofore great difficulty has been experienced in operating upon such articles as vamps, toe tips, or the like, in flat bed cutting machines, as the material would wrinkle, would not lie evenly, and no prior clamping or holding devices of which I am aware, extended closely adjacent the line of pressure of such prior machines, except only at the immediate front of the machine. My invention of a holding, protecting, and also gauging mask, performs the very important and vital function of clamping the material to be operated upon, sufficiently along the side or sides of the cutting or ornamenting action and preferably partly or even entirely around the portion to be operated upon. Therefore, by extending my mask or clamping action beyond the former line of holding and partly surrounding the cut out or ornamented portion, I have eliminated prior difficulties, and am thus enabled to operate upon flat bed work much more advantageously than was formerly possible. This clamp also, being of thin sheet metal, when adapted to press down upon a completed shoe upper, can easily have extra portions cut out, for any purpose as at the tip seam or other place where there is an extra mass or thickness of material, and thereby prevent damage to the same, eliminate breaking of stitching, marring of patent leather, tearing strain on satin, suede or other material of which the upper is made.

Positioned and arranged under the protecting guard or mask I provide a yieldable element, cooperating with the portion of the material adjacent the sections to be cut out, to yield with the pressure or the plunger during the cutting out action, and acting as a "stripper" element, during the release of the pressure and to lift and restore the uncut part of the work above the cutting dies. This stripper element may be any yieldable member, such as a steel plate mounted on a plurality of springs and having a form or contour substantially corresponding to the design of the cut-out die and resulting cut out portions on the work. While I preferably utilize a metallic yielding strip, any yielding element such as rubber or the like can be employed for this yielding and stripping action.

Referring to the drawings, illustrating preferred embodiments of my present invention, Fig. 1 is an elevation of the left side of my machine showing an anvil die with mask.

Figure 1:
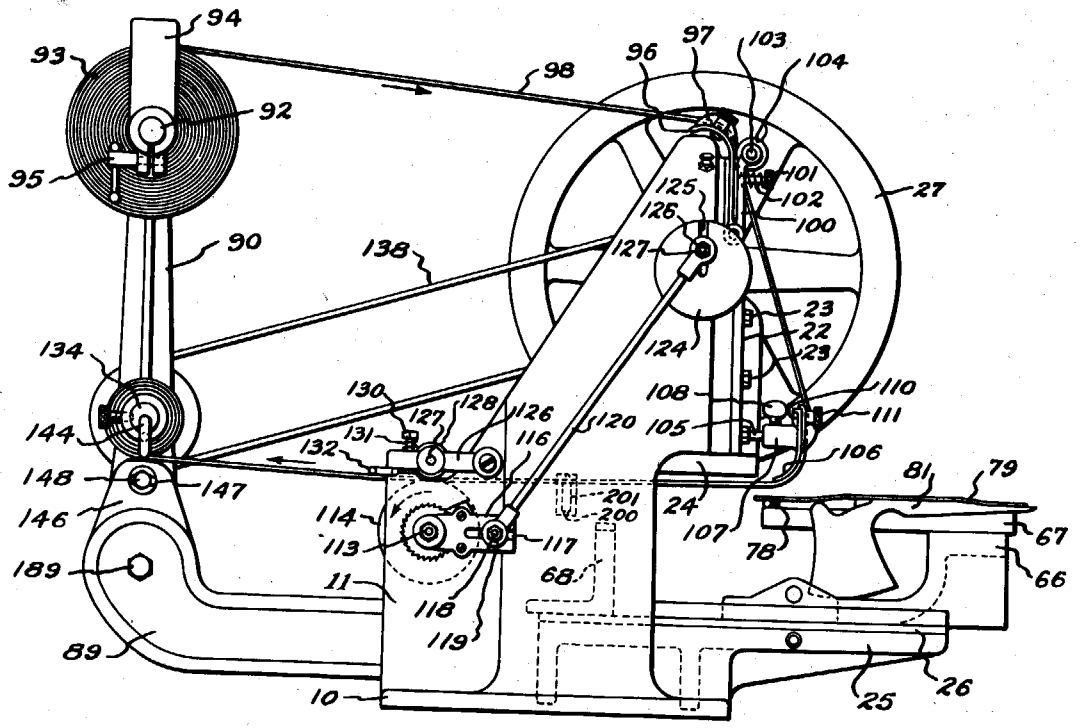
Figure 2:
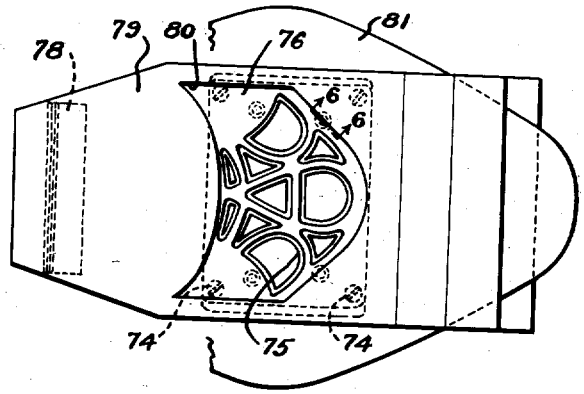
Fig. 2 is a plan view of a cutting anvil showing one exemplification of a design to be cut out, for example, on the upper of a shoe.

The machine illustrated in Fig. 1 has a supporting base 25 with guideways 26 thereon. The frame 10 extends upwardly and overhangs the base 25 and has guideways 22 for a pressure member or plunger 24. The mechanism is so arranged (see my said Letters Patent 1,681,033) to cause the pressure member or plunger to descend upon release of a clutch this being inhibited until the die support is moved to a position under the pressure member.

Arranged for sliding movement in the guideways 26 on the top of the platen 25 is a base 66 which has secured thereon and at its upper end a cutting anvil 67, the details of which are described in Patent 1,681,033. As best shown in Fig. 1, the protecting spaces or clearances at each side of the slide 66 and cutting anvil 67, when the same is in operative position under the plunger, provides a substantial working space for the hands of the operator above the platen 25 and below the plunger face 24 of the machine and at the sides of the work supporting and cutting devices to facilitate adjusting and holding of the work without danger of injury to the operator's hands.

Figure 3:
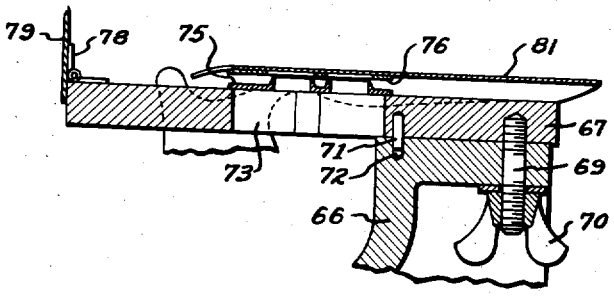
Fig. 3 is a vertical sectional side elevation of a carrying block with a cutting anvil positioned thereon and with the upper in position to have a design such, for example, as that illustrated in Fig. 2 and stamped out therefrom, the protecting mask in this figure being shown out of its normal position.

Referring now to Figs. 2–8 inclusive wherein are shown the cutting anvil and attached work and mechanism, it will be noted by reference to Fig. 3 that the anvil 67 is removably secured to the base 66 by stud 69 and wing nut 70, a pin 71 secured to the under side of the cutting anvil 67 cooperating with a hole 72 in the upper surface of the base 66 for correctly positioning the cutting anvil 67 on such base. The cutting anvil 67 is perforated at 73 and secured to the supper surface of the anvil by screws 74 is a cutting die 75, the cutting dies being of any shape or form such, for example, as shown in my Patent No. 1,675,295.

Figure 4:
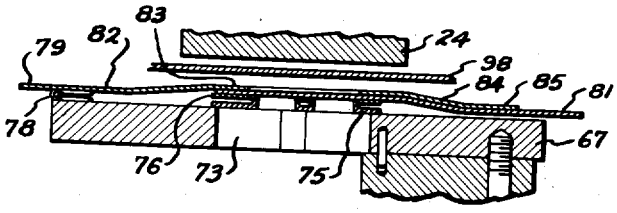
Fig. 4 is a view similar to Fig. 3, but with the mask folded down in position on the upper and with the plunger of the press moving toward the cutting anvil, a strip of heavy paper being positioned between the plunger and cutting anvil.
Figure 5:
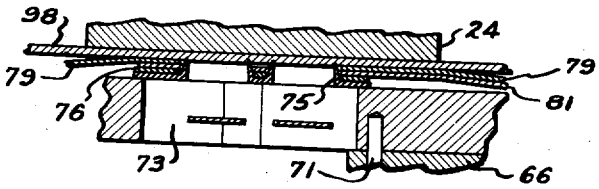
Fig. 5 is a view similar to Fig. 4, but with the plunger moved into position, with respect to the anvil so as to cut out a design on the shoe upper.
Figure 6:
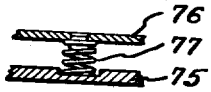
Fig. 6 is a sectional elevation of a fragment of a stripper plate.
Figure 7:
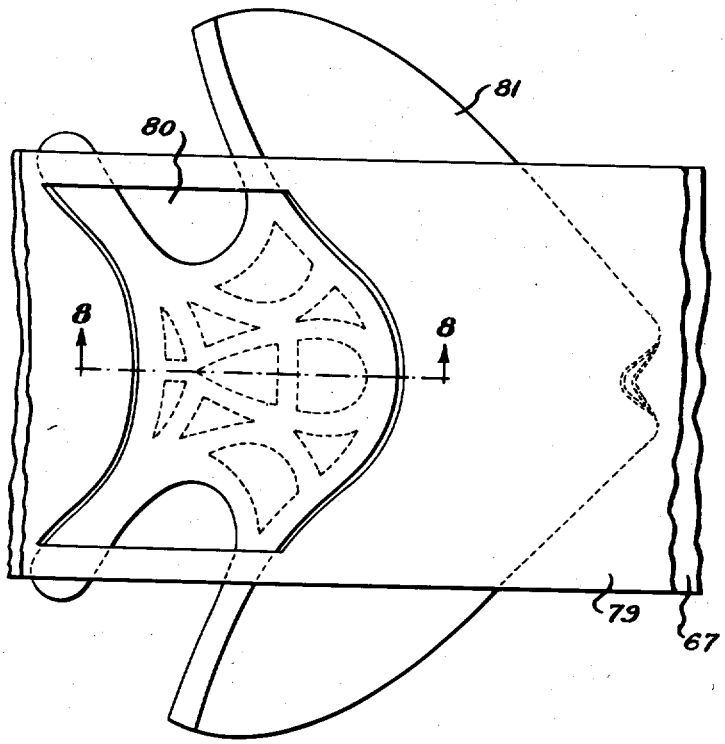
Fig. 7 is a plan view showing the mask in position on an upper.
Figure 8:
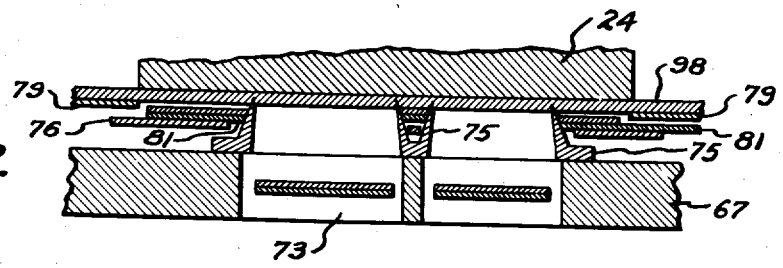
Fig. 8 is a section on the line 17—17 of Fig. 7.

Associated with the die structure 75 is a stripper plate 76 and lying between the stripper plate and the die structure 75 are compression springs 77 which tend to hold the stripper plate slightly above the plane in which lies the cutting edge of the die structure 75. Hingedly secured to the rear end of the cutting anvil 67 by hinge 78 is a mask 79. In this mask 79 is cut an opening 80 of such shape as to allow an upper 81 to be accurately positioned on the cutting anvil 67 with respect to the die 75 secured to such anvil. To facilitate the correct positioning of the upper on the cutting anvil 67, the contour of the opening 80, or certain portions of such contour, correspond in size and position, relative to the cutting die 75, with a seam or other fixed portion of the upper 81. With this arrangement, it is possible to correctly position an upper on the cutting anvil and in proper registry with the cutting die 75, even though it is impossible, under the circumstances, to directly observe the relation existing between the cutting die and the upper because of the fact that such cutting die is completely hidden by the upper. The mask 79 is of the shape, in longitudinal section, as shown in Fig. 4; that is, the left hand portion adjacent the hinge member 78 is engaged by the portions 82 and 83 of the mask. Such portions will hold one end of the upper 81 in approximate position and the complete position of the upper will then take place, after which the operator will pull down the mask 79 into the position shown in Fig. 4 where it will be observed that the front portion of the upper is engaged by the portions 84 and 85.

The operation of my improved apparatus is as follows, it being assumed that such apparatus is constructed as above described. An appropriate cutting anvil 67 having secured thereon a cutting die 75 in which is fashioned the particular design desired to be cut from the material is provided. It is assumed that the design on the die 75 is that shown in Figs. 16 and 17 or may be that shown in Fig. 2. A mask 79 is provided with an appropriate cut out 80 of such shape as to allow the seam or other fixed or finished part on the upper to be clearly viewed through such opening and the seam properly centered with respect to the design on the die. This mask 79, to hold, to guard, guide, and protect the work is attached to the cutting anvil 67 by the hinge 78.

The operator slides the base 66 back or to the right, as viewed in Fig. 1, throws the mask 79 into an upright position, as viewed in Fig. 3, places an upper 81 into approximate position over the die 75, then swings the mask 79 downward so that the portions 82 and 83 thereof engage with the upper and, by grasping said upper on either side of the cutting anvil 67, the cut out portion 80 may be utilized as a means for registering and centering the seam or other finished part of the upper with respect to the design on the die 75 even though such die 75 is hidden from view by the upper and seam. After properly centering the upper 81, the mask 79 is pulled down into the position shown in Fig. 4. The operator now moves the base 66 with the attached portions thereon in proper position to the left, as shown in Fig. 1, until such base is brought to rest by the stop block 68.

Thereupon by depression of a treadle the pressure member is caused to strike the work, and cause the die to cut through the desired hole. As to aspects other than the mask, the features of my work support which are capable of use both in operating upon flat or sheet material, and the combination of materials such as is presented in a shoe upper of joined parts, lining, etc., wherein clearance and space is provided around and about the support, preferably below the line of the cutting operation, are covered elsewhere.

I may reverse the cutting elements and cause them to move down from above. In certain embodiments the cutting die including the cutting instrumentalities, stripper plates, and guiding masks may be separated into cooperating or interchangeably locked parts.

My die with mask plate will do all the operations heretofore performed upon flat bed machines, and in addition thereto, will operate advantageously upon articles having a curved contour such as is presented in shoe uppers. For this latter work I may apply a fitted, partly fitted, or completely fitted and closed upper on the work support, positioned either as shown in the drawings or in reverse direction, and indeed may position the work supporting slide either as shown or in reverse position.

My invention is further described and defined in the form of claims as follows:

1. The combination of a support, an ornamenting die on the support, means for stripping a shoe upper from the ornamenting die, and a shoe upper gauging mask, said mask having position indicating means partially surrounding a portion of an upper being ornamented and shaped to correspond with portions of the shoe upper design, whereby said upper may be correctly aligned with said position indicating means.

2. The combination of a support, an ornamenting die on the support, means for stripping a shoe upper from the ornamenting die, and a shoe upper clamping mask, said mask having upper engaging means partially surrounding that portion of the upper being ornamented, and shaped to correspond with portions of the shoe upper design.

3. The combination for use in a machine for ornamenting parts of boots and shoes, comprising ornamenting means, means for stripping the work from the ornamenting means, clamping means, supporting means upon which said ornamenting means is mounted, said clamping means constructed to hold a portion of the work and substantially surround the ornamenting means with its opening shaped to correspond with portions of the shoe upper design.

4. A support for shoe upper material to be ornamented, comprising an ornamenting means and stripping means mounted thereon, and a clamping mask cooperating with said stripping means to hold a portion of shoe upper material under tension, said mask being provided with an edge portion to partially surround that portion of the upper material to be ornamented, said edge portion being shaped to act as a gauge for the positioning of the material beneath the mask.

5. In combination with a cutting die having cutting edges for cutting designs in shoe upper materials, a support for the die and a mask cooperating therewith, said mask constructed with one or more openings to partially surround the cutting edges of the die and adapted to be pressed against the work, the mask portions surrounding said openings shaped to correspond with portions of the upper material design.

6. In combination with a cutting die having cutting edges for cutting designs in shoe upper material, a support for the die and a mask cooperating therewith, said mask being provided with one or more edge portions to partially surround the cutting edges of the die, said edge or edge portions shaped to act as a gauge for the positioning of the material beneath the mask.

7. A support for shoe upper material and a clamping member cooperating therewith constructed and arranged to provide a preliminary yielding engagement permitting adjustment of the material, and subsequently a firm holding engagement therewith.

8. In combination, a cutting die provided with cutting edges, a support for said die, a mask for the cutting die mounted on said support, comprising a flat plate adapted to be pressed against the work, said plate being provided with an opening through which the work may be observed and accurately positioned with respect to the cutting edges of the die.

9. In combination, a cutting die provided with cutting edges, and a holddown plate for the cutting die comprising a flat plate adapted to be pressed against the work, said plate being provided with an opening to surround the cutting edges of the die, one edge of said opening being arranged to act as a gauge for the positioning of a piece of work beneath the holddown.

BENJAMIN W. FREEMAN.